United States Patent
Beasley

(10) Patent No.: US 7,203,303 B1
(45) Date of Patent: Apr. 10, 2007

(54) METHODS AND DEVICES FOR IDENTIFYING TELECOMMUNICATIONS EQUIPMENT

(75) Inventor: Thomas W. Beasley, Lawrenceville, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 390 days.

(21) Appl. No.: 10/252,263

(22) Filed: Sep. 23, 2002

(51) Int. Cl.
 H04M 3/00 (2006.01)
 H04M 3/42 (2006.01)

(52) U.S. Cl. .................... 379/247; 379/201.01

(58) Field of Classification Search ............... 379/247, 379/201.01; 709/250; 702/245, 203
 See application file for complete search history.

(56) References Cited

U.S. PATENT DOCUMENTS

| | | | | |
|---|---|---|---|---|
| 5,434,775 A | * | 7/1995 | Sims et al. | 705/8 |
| 5,715,622 A | * | 2/1998 | Giordano | 40/661.03 |
| 5,867,688 A | * | 2/1999 | Simmon et al. | 709/208 |
| 5,939,695 A | * | 8/1999 | Nelson | 235/383 |
| 5,959,275 A | * | 9/1999 | Hughes et al. | 235/375 |
| 6,170,059 B1 | * | 1/2001 | Pruett et al. | 713/200 |
| 6,301,622 B1 | * | 10/2001 | Kim et al. | 709/250 |
| 6,508,401 B1 | * | 1/2003 | Terme | 235/385 |
| 6,622,919 B1 | * | 9/2003 | Wilz et al. | 235/472.01 |
| 2001/0054005 A1 | * | 12/2001 | Hook et al. | 705/20 |
| 2002/0095487 A1 | * | 7/2002 | Day et al. | |
| 2003/0036983 A1 | * | 2/2003 | Hougen et al. | 705/28 |
| 2003/0154312 A1 | * | 8/2003 | Berglund et al. | |
| 2004/0024867 A1 | * | 2/2004 | Kjellberg | 709/224 |
| 2004/0210442 A1 | * | 10/2004 | Glynn et al. | 704/275 |

* cited by examiner

Primary Examiner—William J. Deane, Jr.
(74) Attorney, Agent, or Firm—Merchant & Gould

(57) ABSTRACT

Methods and devices provide identification for telecommunications equipment by displaying identification information on a display screen proximal to the equipment. The identification information may be entered through a user input device such as a keypad or may be pre-stored in memory of the telecommunications equipment, such as through a network connection used to maintain the equipment. The identification information may include a unique name of the equipment and/or a description of the function that the equipment performs. A technician may then determine information about the telecommunications equipment by approaching the equipment and viewing the information on the display screen.

15 Claims, 3 Drawing Sheets

METHODS AND DEVICES FOR IDENTIFYING TELECOMMUNICATIONS EQUIPMENT

TECHNICAL FIELD

The present invention is related to the identification of telecommunications equipment. More particularly, the present invention is related to providing a display of identification information on a display screen located proximally to the telecommunications equipment.

BACKGROUND

Telecommunications equipment is typically stored in racks in a stacked and/or side-by-side configuration within a building such as a central office. The various pieces of equipment may appear identical on the exterior but each piece of equipment has a dedicated function within a telecommunications system. When a particular piece of equipment must be repaired, replaced, or serviced in some other manner, a technician must access the correct device to prevent disturbing other telecommunications services provided by the adjacent equipment. However, this can be confusing and time consuming because of densely populated and indistinguishable devices.

To assist the technician in finding the correct piece of equipment, maps of equipment are often maintained so that each device has a grid location. The technician finds the grid location for the equipment of interest from the map and then approaches the device at the particular grid location previously found. However, the reference map may contain errors or the technician may interpret the grid locations incorrectly when approaching the equipment. In either case, the technician may inadvertently begin servicing the incorrect device resulting in a loss of service. Meanwhile, the device that is intended to receive maintenance remains unaddressed.

SUMMARY

Embodiments of the present invention address these and other problems through devices and methods that provide an identification display proximal to each device. The identification display may provide one or more descriptions that allow a technician to view the display once the device has been approached to verify that the device is the intended one.

One embodiment is a device for identifying telecommunications equipment. The device includes an input device that receives user input that identifies the telecommunications equipment. A memory stores the user input received through the input device, and a display screen proximal to the telecommunications equipment displays the user input to identify the telecommunications equipment. A processing device in communication with the input device, the memory, and the display screen, is configured to receive the user input from the input device, store the user input in the memory, and display the user input stored in the memory on the display screen.

Another embodiment is a device for identifying telecommunications equipment wherein the telecommunications equipment includes a memory that stores information that identifies the telecommunications equipment. The device includes a display screen proximal to the telecommunications equipment that displays the information to identify the telecommunications equipment. An interface in communication with the memory and the display screen is configured to access the information from memory and display the information on the display screen.

Another embodiment is a method for identifying telecommunications equipment. The method involves storing identification information in a memory and accessing the identification information from the memory. The identification information accessed from the memory is displayed on a display screen proximal to the telecommunications equipment.

Another embodiment is a telecommunications device. The device includes a display screen that displays identification information for the telecommunications device and a memory that stores the identification information. A processing device accesses the identification information from memory to display the identification information on the display screen. Telecommunications components are also included to send and receive telecommunications signals.

DETAILED DESCRIPTION

Display devices are provided proximal to telecommunications equipment to display identification information allowing a technician to readily determine whether a particular device is the device that is of interest to the technician. Thus, the technician can be more certain that the device that has been approached is the device that should be repaired, replaced, or otherwise serviced.

Figure 1:
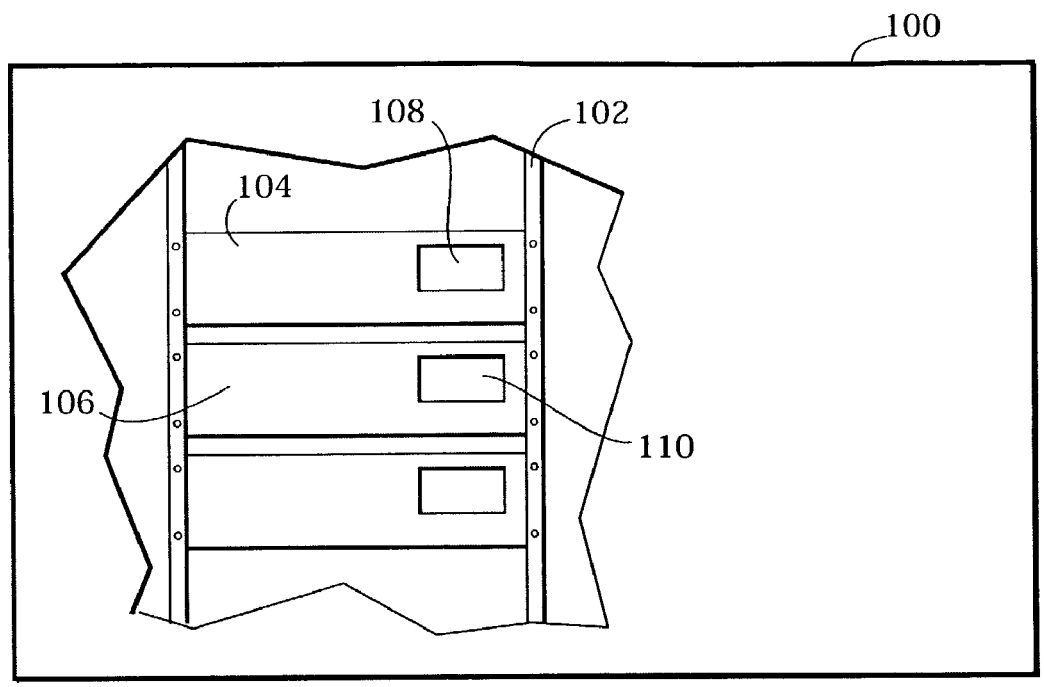
FIG. 1 illustrates a typical central office operating environment for embodiments of the present invention.

FIG. 1 shows a central office 100 that contains various pieces of telecommunication equipment to provide telecommunications services to a particular geographical region. The telecommunications equipment in a central office 100 typically includes circuit-switching devices for providing plain old telephone service ("POTS"). Additional types of telecommunications equipment may also be contained within a central office 100, such as packet-switching devices that route data packets.

The pieces of telecommunication equipment within a central office 100 or other similar structure that houses equipment often have the same or similar chassis exterior making them visually indistinguishable. However, the various pieces of equipment may be performing entirely different functions or be assigned to handle different physical connections within a circuit-switched or packet-switched telecommunications network. Yet, the devices may be located side-by-side or in a stacked configuration within a rack 102 as shown in FIG. 1 for device 104 and device 106.

As an example, device 104 may include components forming a switch that performs Internet call diversion for dial-up Internet connections to free up voice trunks for voice traffic. In this same example, device 106 may appear from the exterior to be the same switch device as device 104 but instead includes components performing IP telephony gateway functions to convert Internet voice traffic back to POTS circuits. When device 104 or device 106 requires maintenance, the technician must be able to address the correct device so that the other device and the services that it provides go uninterrupted.

To enable the technician to easily verify that the correct device has been approached, the telecommunications device 104 has a display device 108 and/or telecommunications device 106 has a display device 110 that has a display screen presenting identification information for that piece of equipment. For example, the display device 108 and/or 110 may display a unique equipment name assigned to the device. In addition to the unique name, or as an alternative, a description of the function being performed by the piece of equipment may be displayed. The technician approaching the device with prior knowledge of the unique device name or function of the device of interest can then read the display screen to verify that the correct device has been approached.

Figure 2:
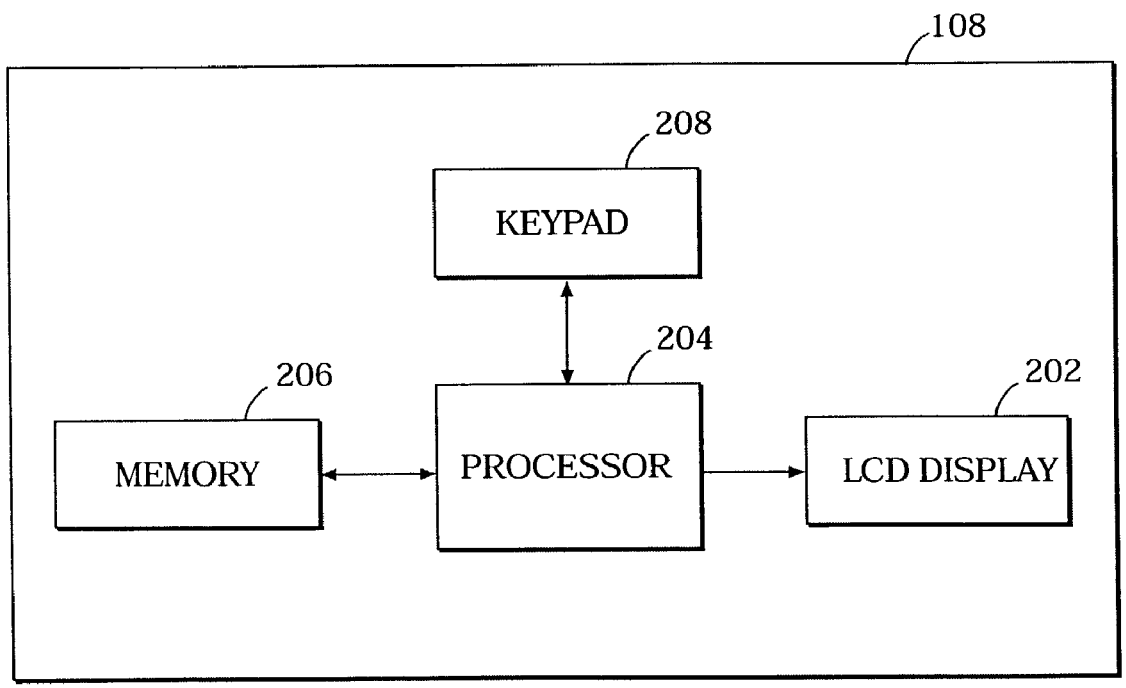
FIG. 2 illustrates the components of one embodiment of a system for providing an identification display for a telecommunication device.

The display device 108 and/or 110 may be of various forms. FIG. 2 shows the major components of one embodiment of the display device. The major components include a display screen 202 such as a multi-line liquid crystal display and associated video controller or similar display output. The display screen 202 receives data to display from a processing device 204, such as data to be formatted for display by the video controller of the display screen 202. Alternatively, the processing device 202 may include an integral video controller that provides display data directly to the display screen 202. The processing device 204 may be of various forms such as hardwired digital logic or a general purpose programmable processor. The processing device 204 accesses identification information data to be displayed from a memory 206. The memory 206 may also be of various forms, but non-volatile memory 206 allows the identification data to remain stored when no electrical power is provided to the display device 108.

The identification information in this embodiment is entered by a user interacting with a user interface device 208 of the display device 108. The user interface device 208 may be of various forms such as a keyboard, keypad, or touch screen that is in communication with the processing device 204. The user interface device 208 may have mode buttons that cause the processing device 204 to provide an input mode where the display screen 202 shows one or more fields to be filled with information and shows the characters within the field(s) as the user enters the information. The processor 204 stores the information received through the user input device 208 into memory 206 where it can be accessed for display.

Thus, the display device 108 of FIG. 2 requires no communication interface to the telecommunication device that it is identifying. Therefore, the display device 108 may be independent of the telecommunication device so that if the telecommunication device malfunctions, the display device 108 of FIG. 2 continues to correctly display the identification information allowing the technician to easily find the telecommunication device to repair or replace it. However, the display device 108 may receive power through the same DC power bus of the central office 100 that provides power to the telecommunication device being identified. Alternatively, the display device 108 may receive power from other sources, such as an on-board battery or AC wall adapter (not shown).

Figure 3:
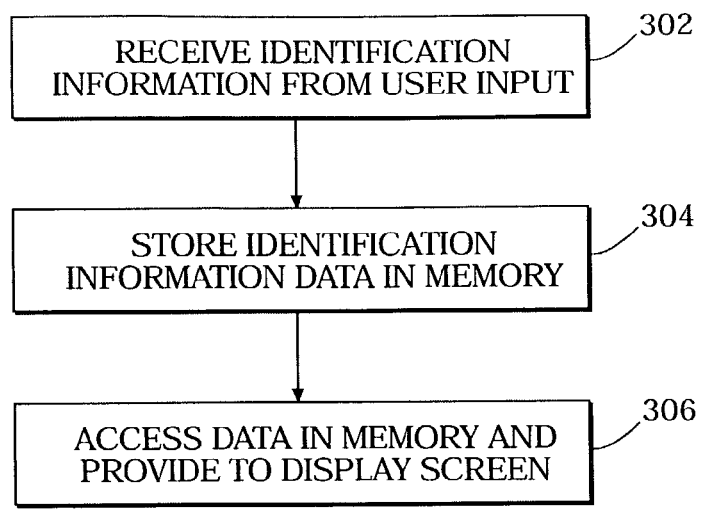
FIG. 3 illustrates the logical operations performed by the embodiment of FIG. 2 to provide the information for the identification display.

FIG. 3 illustrates the logical operations performed by the processing device 204 of the display device 108 of FIG. 2. The processing device 204 receives the user input specifying the identification information at receive operation 302. The processing device 204 stores the identification information data received from the user input device 208 into memory 206 at store operation 304. Store operation 304 may occur during performance of receive operation 302 such that as characters are received, they are stored. Alternatively, store operation 304 may occur after receive operation 302 has completed where the processing device queues the identification information as it is being received, such as in data registers, cache memory, or other temporary storage of the processing device 204.

Once the identification information data has been stored in memory 206, the user input mode may terminate and the processing device 204 enters a display mode. In display mode, the processing device 204 accesses the previously stored identification information at retrieve operation 306 and provides the data to the display screen 202. The display screen 202 then displays the identification information for viewing by the technician. The identification information may include the unique device name, function description, or a combination of both to assist the technician.

Figure 4:
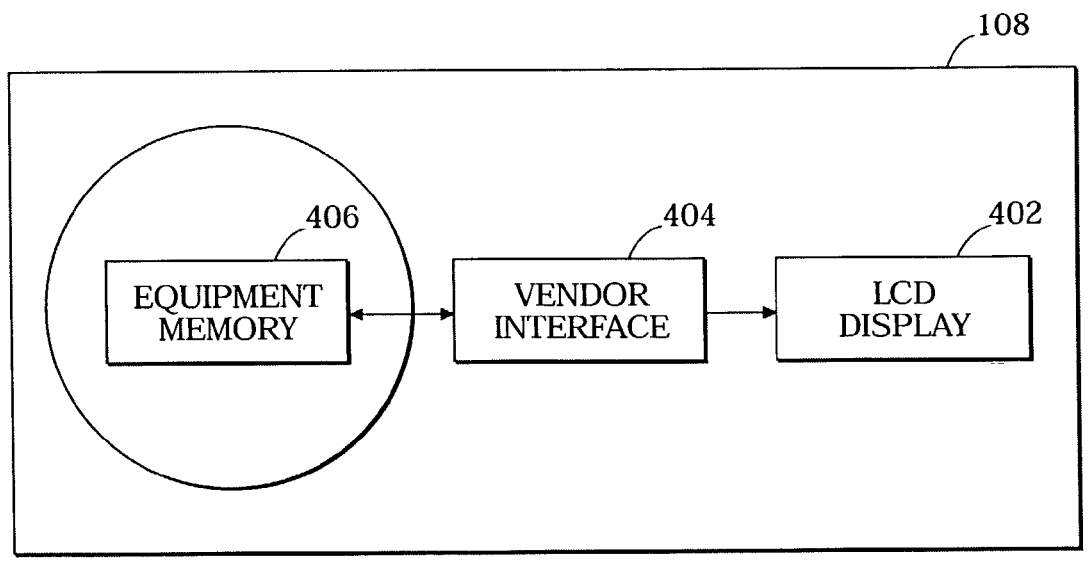
FIG. 4 illustrates the components of another embodiment of a system for providing an identification display for a telecommunication device.

FIG. 4 shows the components of another embodiment of the display device 108. This embodiment of FIG. 4 lacks a user input device but instead interfaces to the telecommunications equipment to access identification information already stored within memory of the telecommunications equipment such as a Common Language Location Identifier ("CLLI") or electronic serial number. This identification information is typically stored in on-board memory of the telecommunications equipment for remote monitoring so that the remote monitoring system can report the identification information to the user of the remote monitor. However, once the remote monitor indicates a problem with a particular telecommunications device, the technician must often still approach the correct telecommunications device so a display device proximal to the telecommunications device continues to be beneficial.

The display device 108 of the embodiment of FIG. 4 includes a display screen 402, such as an LCD display. The display screen 402 receives display data from a vendor interface 404. The vendor interface 404 is a data connection to the output port of the telecommunications device intended to supply data to the remote monitoring system over a network from the equipment memory 406. Similarly, the port of the telecommunications device may be used to provide information to the equipment memory 406 such that it behaves as in I/O port. The output port is typically a serial data output but may be of various other forms as well, such as a parallel data output, or a high-speed serial data output such as an IEEE 1394 port or a first or second generation universal serial bus port.

The vendor interface 404 of the display device 108 includes logic, such as a programmable processor or hard wired logic, to access the identification information from the appropriate equipment memory location and to provide the identification data to the display screen 402. As discussed above in relation to the embodiment of FIG. 2, the display screen 402 may include its own video controller that receives the information data and formats the data for display by the display screen 402. Alternatively, the vendor interface 404 may include an integral video controller to pass the display data directly to the display screen 402 for display of the identification information.

Figure 5:
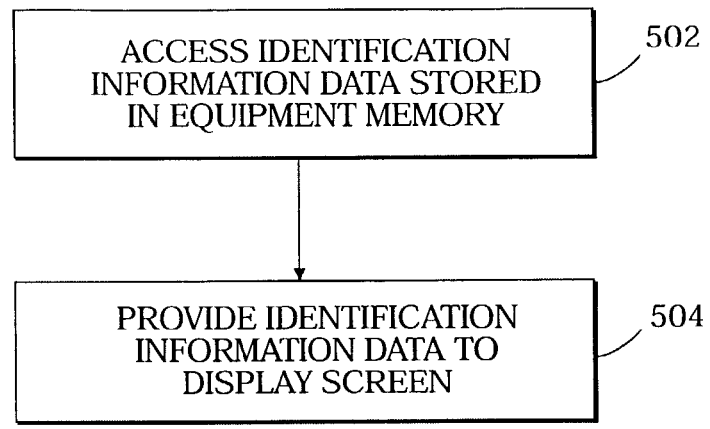
FIG. 5 illustrates the logical operations performed by the embodiment of FIG. 4 to provide the information for the identification display.

FIG. 5 illustrates the logical operations of the vendor interface 404. Initially, the vendor interface 404 accesses the identification information data from the equipment memory 406 through the associated data port of the telecommunications device at retrieve operation 502. Then, the vendor interface 404 provides the identification data to the display screen 402 for display at transfer operation 504.

It will be appreciated that the embodiment shown in FIGS. 4 and 5 may be combined with the embodiment of FIGS. 2 and 3 so that a user may provide additional information to be displayed besides the information pre-stored in the equipment memory 406. In such an example, the display device 108 includes the user input device 208 and may include its own memory 206, or alternatively, the processing device 206 may provide the user input data through the vendor interface 404 to the equipment memory 406 where it can be stored.

Figure 6:
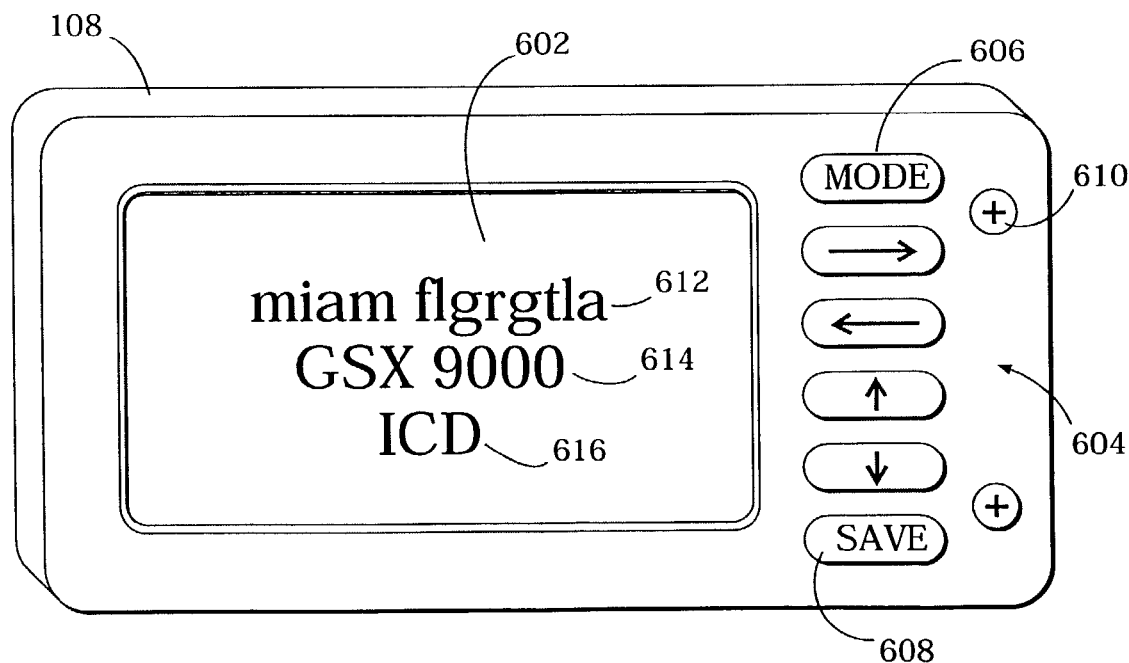
FIG. 6 shows a front view of the exterior of a display device according to one embodiment of the present invention.

FIG. 6 shows an example of an exterior view of the display device 108 including the display screen 602 and keypad 604. In this example, the display screen 602 displays a unique name 612 for the telecommunications equipment. The unique name 612 may be of various forms but is different from other names used for equipment within the same area or central office 100. The model name 614 of the telecommunications equipment is displayed below the unique name, and a description of the function 616 is displayed below the model name 614. In this example, the function "ICD" is an abbreviation for Internet call diversion.

The user input device may be a keypad 604 that itself may be of various forms. For example, the keypad 604 may be alphanumerical such as a keypad of a telephone. Alternatively, the keypad 604 may contain various navigation keys to navigate within selections provided by the processing device on the display screen 602 when in the input mode. For example, the processing device may provide a display of a typical keyboard on the display screen 602 to allow the user to use the arrow keys of keypad 604 to move a cursor around on the keypad to select the necessary characters for the display.

The keypad 604 may also include a mode key 606 to allow the user to select from the various modes provided by the processing device, such as the input mode and the display mode discussed above. Also, a save key 608 may be included to allow the user to direct the processing device to store the entered characters in memory. Alternatively, a save selection may be provided on the display screen 602 or the processing device may employ an automatic save such as after a specified amount of time.

The display device 108 may be attached proximally to the telecommunications device being identified in various ways. For example, the display device 108 may be attached directly to a faceplate of the equipment or to the rack holding the equipment with screws 606 or another similar fastener such as a nail or VELCRO hook and loop material.

While the invention has been particularly shown and described with reference to illustrative embodiments thereof, it will be understood by those skilled in the art that various other changes in the form and details may be made therein without departing from the spirit and scope of the invention.

What is claimed is:

1. A device for identifying telecommunications equipment wherein the device is attached to the telecommunications equipment, comprising:
   an input device attached to the telecommunications equipment and that receives user input that identifies the telecommunications equipment;
   a memory within the telecommunications equipment that stores the user input received through the input device;
   a display screen attached to the telecommunications equipment that displays the user input to identify the telecommunications equipment; and
   a processing device in communication with the input device, the memory, and the display screen, wherein the processing device is configured to receive the user input from the input device attached, store the user input in the memory, and display the user input stored in the memory on the display screen;
   wherein the user input comprises entered characters that uniquely identify the telecommunications equipment.

2. Previously presented) The device of claim 1, wherein the input device attached is a keypad that includes:
   a mode key to allow a user to select between an input mode and a display mode; and
   a save key to allow the user to direct the processing device to store the entered characters in the memory.

3. The device of claim 1, wherein the display screen is a liquid crystal display that displays a save selection to allow the user to direct the processing device to store the entered characters in the memory.

4. The device of claim 1, wherein the user input comprises a unique equipment name.

5. The device of claim 1, wherein the user input comprises a function description.

6. A device for identifying telecommunications equipment wherein the telecommunications equipment includes a memory that stores information that identifies the telecommunications equipment, the device comprising:
   a display screen integral with the telecommunications equipment and that displays the information to identify the telecommunications equipment; and
   an interface in communication with the memory of the telecommunications equipment and the display screen, wherein the interface is configured to receive the information via user input, store the information in the memory, access the information from the memory of the telecommunications equipment and display the information on the display screen;
   wherein the device is integral with the telecommunications equipment and wherein the user input comprises characters entered by a user that uniquely identify the telecommunications equipment.

7. The device of claim 6, wherein the display screen is a liquid crystal display.

8. The device of claim 6, wherein the information comprises a unique equipment name.

9. The device of claim 6, wherein the information comprises a function description.

10. A method for identifying telecommunications equipment, comprising:
    receiving via a user input device attached to the telecommunications equipment, user input including identification information that identifies the telecommunications equipment;
    storing via a processing device integral with the telecommunications equipment, the identification information in a memory within the telecommunications equipment;
    accessing the identification information from the memory; and displaying the identification information accessed from the memory on a display screen integral with the telecommunications equipment to the telecommunications equipment;

wherein the user input comprises entered characters that uniquely identify the telecommunications equipment.

11. The method of claim 10, wherein the user input device is a keypad that includes:
   a mode key to allow a user to select between an input mode and a display mode; and
   a save key to allow the user to direct the processing device to store the entered characters in the memory.

12. The method of claim 10, wherein the identification information comprises a unique equipment name.

13. The method of claim 10, wherein the identification information comprises a function description.

14. The method of claim 10, wherein the display screen is a liquid crystal display.

15. The method of claim 10, wherein the telecommunications equipment includes a port in communication with the memory, and wherein the method further comprises:
   entering the identification information through the port; and
   directing the identification information from the port to the memory of the telecommunications equipment when storing the identification information in the memory;
   wherein the port comprises one of the following:
      a parallel data output port;
      a high-speed serial data output port;
      a first generation universal serial port; and
      a second generation universal serial port.

* * * * *